United States Patent [19]
Grimes

[11] 3,827,163
[45] Aug. 6, 1974

[54] TRIGONOMETRY TEACHING DEVICE

[76] Inventor: Alton C. Grimes, Mississippi State, State College, Miss. 39762

[22] Filed: May 24, 1973

[21] Appl. No.: 363,556

[52] U.S. Cl. .............................. 35/34, 235/61 GM
[51] Int. Cl. ......................................... G09b 23/04
[58] Field of Search ................ 35/34, 30; 33/76 R; 235/61 GM

[56] References Cited
UNITED STATES PATENTS
| | | | |
|---|---|---|---|
| 1,955,392 | 4/1934 | Shimberg | 35/34 U X |
| 3,137,443 | 6/1964 | Samuelson | 35/34 U X |
| 3,359,654 | 12/1967 | Boyte | 35/34 |

*Primary Examiner*—Wm. H. Grieb
*Attorney, Agent, or Firm*—James W. Pearce; Roy F. Schaeperklaus

[57] ABSTRACT

A device for visualizing functions and their variations, the value of each function and the demonstration of fundamental identities and equations of condition comprises a platform, a rotatable transparent disc and a transparent slide member. The slide member moves linearly in response to disc rotation. Circular and linear scales imprinted on the three parts cooperate in the teaching method.

5 Claims, 2 Drawing Figures

TRIGONOMETRY TEACHING DEVICE

This invention relates to graphical teaching devices for mathematics, more particularly to devices helpful in teaching trigonometry.

A principal object of this invention is the teaching of trigometric functions, values and identities by use of a manually operated visual display in which transparent superimposed members imprinted with coordinates protracted angles and scaled trigometric functions move with respect to each other as determined by a coordinate centered spindle and a pin fixed in one member slideable in a slot in a second member.

Another object of the present invention is to provide a teaching device that is flexible in overall size. Demonstrations can be made equally well from vest pocket to classroom size.

Still another object of the invention is to provide a device that is simple in construction, easy to operate, long lasting and lends itself to low cost manufacture, making it widely attractive for purchase by students or, in large blackboard sizes, for purchase by schools.

These and other objects will become evident upon a study of the following specification together with the accompanying drawing wherein.

Figure 1:
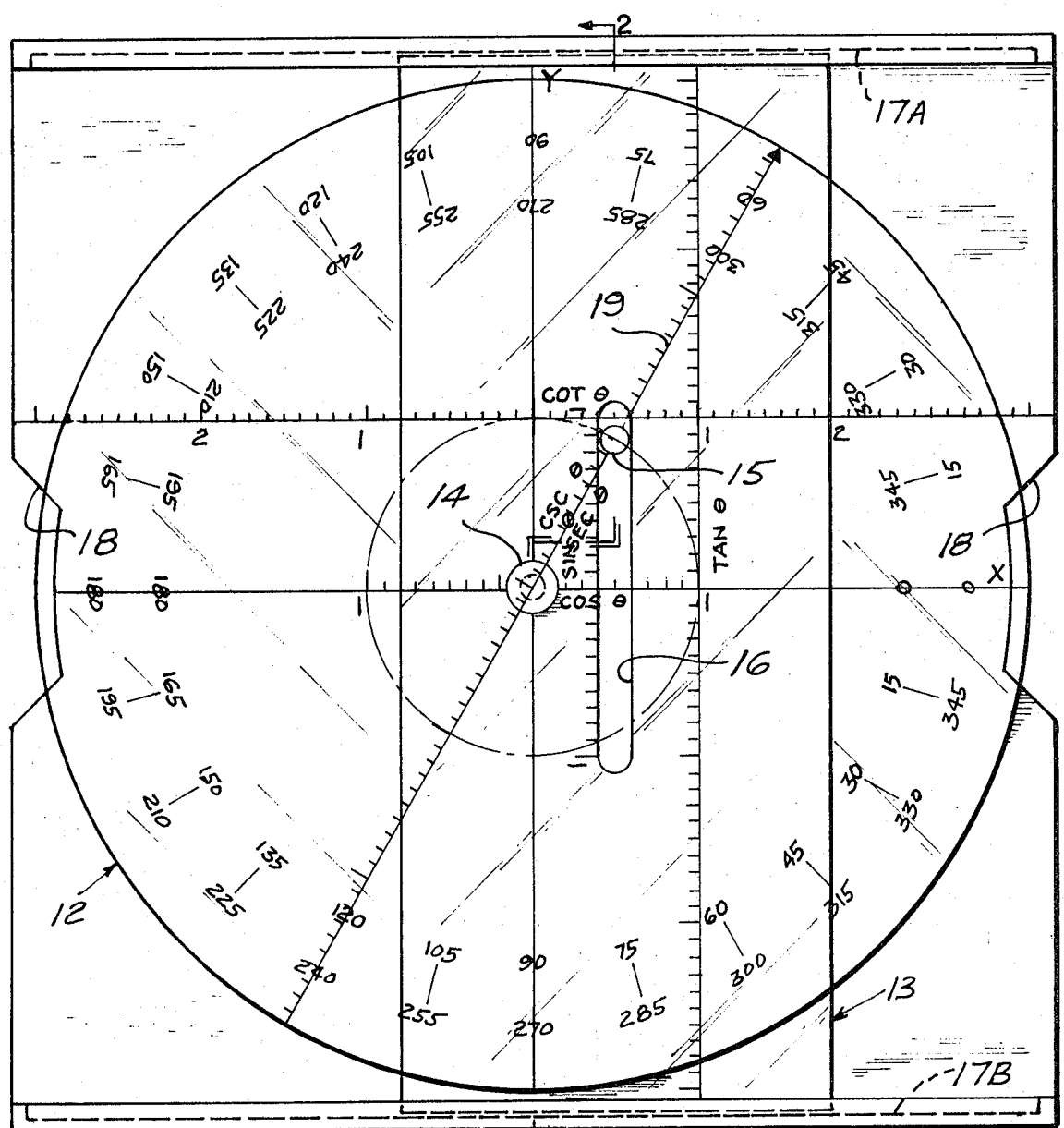
FIG. 1 is a plan view of the device.
Figure 2:
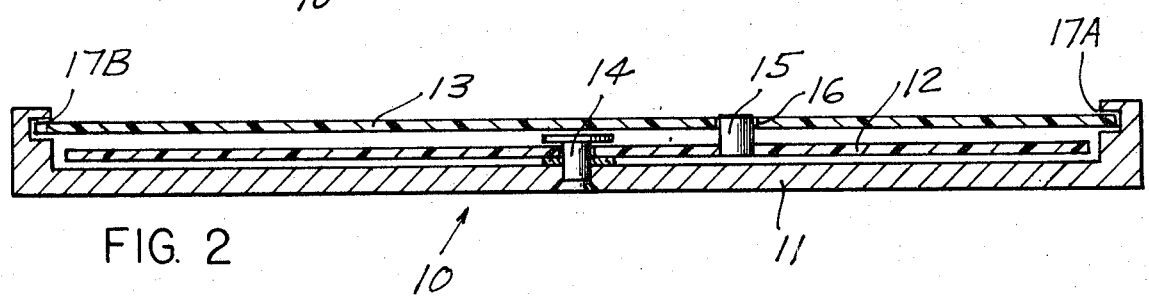
FIG. 2 is a section view taken along the broken section line 2-2 of FIG. 1.

Referring to the figures, the device 10 comprises in mechanical combination a base 11, a rotatable transparent disc 12 and a transparent slideable member 13. Disc 12 is spindled on a pin 14 at the center of base 11. A pin 15 fixed in disc 12 projects through a slot 16 in slide 13. In order to restrain movement of slide 13, against turning, the slide ends fit smoothly into a pair of grooves 17a and 17b in base 11. For comfortable single access to disc 12, base 11 is recessed or notched at 18, slightly inside the disc periphery. It now becomes evident that manual rotation of disc 12 causes slide 13 to move between extreme positions determined by the radius from pin 14 to pin 15.

Inspection of FIG. 1 shows the imprinting on base 11 of X and Y-axes representing algebraic coordinates centered at pin 14. Also imprinted on base 11 are scales representing tangents, cotangents and cosines. Finally, base 11 is imprinted with angle values proceeding in both directions from the X-axis. Disc 12 is imprinted with a scaled vector and marked for identifying secants and cosecants. Slide 13 is imprinted along slot 16 with scaled values identifying sines.

It will be observed that the divisions agree with a unit circle imprinted on base 11 having a radius equal to the distance from pin 14 to pin 15. Thus pin 15 moves from tangency at the cotangent line to tangency at the tangent line.

In moving through the quadrants positively, vector 19 turns counterclockwise. In order to distinguish negative values of trigometric functions when vector 19 moves clockwise, the use of the device may be enhanced by putting positive values in one color such as black and negative values in another color, such as red. Thus the degree scale reading clockwise, the left hand portions of the cotangent and cosine lines, the bottom half of the tangent line and the rear half of vector 19 would be in red.

Since a nomograph is a line representation of a function, this device may well be called "TRIGONOMOGRAPH."

The invention is designed as a teaching and learning device. The assumed title "TRIGONOMOGRAPH" implies a line representation of each of the trigometric functions. By rotating the disc counterclockwise for positive angles and clockwise for negative angles, one is able to see the variations of each function. Stopping on any desired angle, the value of any one of the functions can be read from the scale for that function. For example, the drawing shows the vector on 60°. From the scale, sine 60°, the distance from the X-axis to the center of pin 15 is approximately 0.86; cos 60°, the distance from pin 14, the origin, to center of slot 16 on the x-axis is 0.5; tan 60°, distance from the x-axis to the intersection of vector 19 with the tangent line is approximately 1.7, while the distance from the origin to this point is sec 60° equals 2; cot 60, the distance from the Y-axis to the point of intersection of the vecter with the cotangent line, is approximately 0.6, while the distance from the origin to this point, is csc 60° approximately 1.2.

The algebraic sign of each function value is determined by the direction it is read in accordance with the coordinate system. Also, when the right triangles are considered, the fundamental identities can be established. For example, the right triangle formed by the X-axis, the vector and the tangent line, gives $\tan^2\theta + 1 = \sec^2\theta$, by the pythagorean theorem. Other triangles give $\cot^2\theta + 1 = \csc^2\theta$, $\cos^2\theta + \sin^2\theta = 1$, etc.

Many other identities can be established and demonstrated as identities by rotating the vector and seeing that they are true for all positions of the vector. Conditional equations can also be demonstrated on the device.

What I now claim is:

1. A trigonometry teaching device comprising a base having a pair of perpendicular axes, a pair of spaced parallel guide surfaces on said base parallel to one of said axes, a spindle projecting from said base at the intersection of said axes intermediate said guide surfaces, a transparent disc rotatably mounted on said spindle, crank pin means projecting from said disc and away from said base and a transparent slide member positionable spanwise of said disc and extending between and in cooperation with said guide surfaces which limit said slide member to movement between parallel positions longitudinally of one of said axes, said slide member having spaced parallel faces perpendicular to the direction of slide member movement, said crank pin means extending spanwise and rotatable between and cooperating with said parallel faces of the slide member whereby the base, slide member and disc remain in correlated positions at all times.

2. A teaching device according to claim 1, wherein said spindle projects centrally from said base and said base is bordered on top and bottom by channels defined by surfaces including said guide surfaces for restraining said slide to movement parallel to itself.

3. A teaching device according to claim 1, wherein said base is imprinted horizontally with cotangent and cosine scales and vertically with a tangent scale, said cotangent and tangent scales spaced at unit distance from respective imprinted axes, said base further imprinted with positively and negatively directed degree scales concentric with said spindle, said rotatable disc imprinted with a scale vector identifying cosecant, said crank pin means being a pin in said disc and said spaced parallel surfaces bounding a slide slot at a radius on said vector equal to the unit distance to said cotangent and tangent scales, said slide imprinted along said slide-slot with a unit scale identifying sines, all said scales agreeing with a unit marking and with each other for reading of trigonometric values directly.

4. A teaching device according to claim 1, wherein said moving and stationary parts, said moving and stationary scales, axes, and vector facilitate the visualization of the variations of trigonometric functions, fundamental identities and equations of condition.

5. A teaching device according to claim 1, wherein positive trigonometric values are imprinted in one color and negative trigonometric values are imprinted in a contrasting color.

* * * * *